US008696786B2

(12) United States Patent
Lopez Quintela et al.

(10) Patent No.: US 8,696,786 B2
(45) Date of Patent: Apr. 15, 2014

(54) PROCESS FOR PREPARING ANISOTROPIC METAL NANOPARTICLES (75) Inventors: Manuel Arturo Lopez Quintela, Santiago de Compostela (ES); Jose Rivas Rey, Santiago de Compostela (ES)

(73) Assignees: Universidade de Santiago de Compostela, Santiago de Compostela (ES); Nanogap Sub-NM Powder, Sociedad Anonima, Ames (ES)

( * ) Notice: Subject to any disclaimer, the term of this patent is extended or adjusted under 35 U.S.C. 154(b) by 0 days.

(21) Appl. No.: 13/635,418

(22) PCT Filed: Mar. 17, 2011

(86) PCT No.: PCT/EP2011/054085
§ 371 (c)(1),
(2), (4) Date: Nov. 5, 2012

(87) PCT Pub. No.: WO2011/113914
PCT Pub. Date: Sep. 22, 2011

(65) Prior Publication Data
US 2013/0061718 A1    Mar. 14, 2013

(30) Foreign Application Priority Data

Mar. 18, 2010   (ES) ................. 2010000387

(51) Int. Cl.
*B22F 1/00*    (2006.01)
*B22F 9/00*    (2006.01)
*C21B 15/04*    (2006.01)
*C22B 5/20*    (2006.01)

(52) U.S. Cl.
USPC ............................................. 75/370; 75/371

(58) Field of Classification Search
CPC .... B22F 1/0018; B22F 1/0022; B22F 1/0025; B22F 9/24
USPC ......... 75/370, 371; 423/22, 23, 138; 428/544; 977/773
See application file for complete search history.

(56) References Cited

U.S. PATENT DOCUMENTS

2010/0215766 A1*   8/2010   Lopez Quintela et al. ... 424/618

OTHER PUBLICATIONS

Kawamura, G., et al., "Application of a conproportionation reaction to a synthesis of shape-controlled gold nanoparticles", "Journal of Crystal Growth", Aug. 14, 2009, pp. 4462-4466, vol. 311.
Yong, K., et al., "Preparation of Gold Nanoparticles and their Applications in Anisotropic Nanoparticle Synthesis and Bioimaging", "Plasmonics", Feb. 28, 2009, pp. 79-93, vol. 4.
Zhang, W., et al., "Synthesis of silver nanoparticles—Effects of concerned parameters in water/oil microemulsion", "Materials Science and Engineering B", Aug. 25, 2007, pp. 1-15, vol. 142.
Long, N., et al., "The synthesis and characterization of platinum nanoparticles: a method of controlling the size and morphology", "Nanotechnology", Jan. 22, 2010, pp. 1-16, vol. 21, No. 35605.
Perez-Juste, Jorge. "Gold nanorods: Synthesis, characterization and applications." Coordination Chemistry Reviews 249 (2005) pp. 1870-1901.

* cited by examiner

*Primary Examiner* — Keith Walker
*Assistant Examiner* — Alexander Polyansky
(74) *Attorney, Agent, or Firm* — Hultquist, PLLC; Steven J. Hultquist (57) ABSTRACT The present invention relates to a new method for preparing anisotropic metal nanoparticles with high aspect ratios and different types of structures by means of catalysis by Atomic Quantum Clusters (AQCs).

17 Claims, 5 Drawing Sheets

PROCESS FOR PREPARING ANISOTROPIC METAL NANOPARTICLES

CROSS-REFERENCE TO RELATED APPLICATIONS

This application is a U.S. national phase under the provisions of 35 U.S.C. §371 of International Patent Application No. PCT/EP2011/054085 filed Mar. 17, 2011, which in turn claims priority of Spanish Patent Application No. P2010000387 filed Mar. 18, 2010. The disclosures of such international patent application and Spanish priority patent application are hereby incorporated herein by reference in their respective entireties, for all purposes.

FIELD OF THE INVENTION

The present invention relates to a new process for preparing anisotropic metal nanoparticles. It belongs to the field of the art of chemical catalysis and its application in the synthesis of anisotropic metal nanoparticles.

BACKGROUND OF THE INVENTION

Today there is a great interest in the production of anisotropic metal nanoparticles with different morphologies, the production of nanofibers being one of the most important due to their application potentials in the preparation of nanocomposites based on non-metal materials (ceramics, polymers, glasses, etc.) in order to render metal properties to these materials. Applications such as new antistatic nanocomposites, nanocomposites for shielding against electromagnetic radiation, nanocomposites and nanocomposite liquids for heat transfer, etc. make this a topic of great importance in recent technology.

The particular physiochemical properties of the AQCs, which unlike nanoparticles have electronic transition bands between different energy levels at the Fermi level (HOMO-LUMO gap or bandgap) and lack the plasmon band typical of nanoparticles, should be pointed out. These particular properties of these materials, due to the important quantum effects which characterize these AQCs, cause their behavior to be different from that of nanoparticles or massive material.

In addition, it is important to obtain the desired metal properties by introducing the lowest possible amount of metal particles in the non-metal matrices both for the cost and for not deteriorating the intrinsic properties of the matrices themselves. Due to the fact that the anisotropic geometries, such as the cylindrical-shaped fibers, allow achieving percolation with very low concentration thresholds, obtaining simple and scalable methods which allow controlling the size and shape of the nanoparticles is a current challenge of extraordinary importance.

In the last few decades, a great amount of chemical methods for the synthesis of nanoparticles of very different shapes and sizes, such as nanocylinders (Busbee, B. D.; Obare, S. O.; Murphy, C., J. Adv. Mater., 2003, 15, 414; Pérez-Juste, J.; Liz-Marzán, L. M.; Carnie, S.; Chan, D. Y. C.; Mulvaney, P., Adv. Funct. Mater. 2004, 14, 571), multishapes (Chen, S.; Wang, Z. L.; Ballato, J.; Foulger, S. H.; Carroll, D. L., J. Am. Chem. Soc., 2003, 125, 16186), nanoprisms (Pastoriza-Santos, I.; Liz-Marzán, L. M., Nano Lett., 2002, 2, 903; Millstone, J. E.; Park, S.; Shuford, K. L.; Qin, L.; Schatz, G. C.; Mirkin, C. A., J. Am. Chem. Soc., 2005, 127, 5312), nanocubes (Im, S. H.; Lee, Y. T.; Wiley, B.; Xia, Y., Ang. Chem. Int. Ed., 2005, 44, 2154), nanotetrahedrons (Wiley, B.; Herricks, T.; Sun, Y.; Xia, Y., Nano Lett., 2004, 4, 1733), or nanodiscs (Maillard, M.; Giorgio, S.; Pileni, M. P., J. Phys. Chem. B, 2003, 107, 2466) have been developed.

Even though this has been one of the most spectacular advances of colloidal chemistry, the methods developed up until now however suffer from various problems and complexities (Pérez-Juste, J.; Pastoriza-Santos, I.; Liz-Marzán, L. M.; Mulvaney, P., Coordination Chemistry Reviews, 249, 2005, 1870-1901) which make them practically unviable for scaling and producing anisotropic nanoparticles in a simple and controlled manner (Jin, R.; Cao, Y. C.; Hao, E.; Metraux, G. S.; Schatz, G. C.; Mirkin, C. A., Nature, 2003, 425, 487).

Apart from other methods that are not relevant to the objectives of the present invention (such as electrochemical deposition methods using solid patterns, etc.) the chemical methods developed up until now to achieve anisotropic growth of the nanoparticles are based on:

The use of agents such as polymers, surfactants, etc. which, by preferential absorption on any of the crystallographic faces of the metal, inhibit the growth of this/these face/faces thus achieving an anisotropic growth of the nanoparticles. Although the control may be suitable in some particular cases, amounts of nanoparticles at very low concentrations are always obtained and in any event in order to achieve the control, complicated reaction conditions such as high temperatures or organic solvents like those used in U.S. Pat. No. 7,585,349, must be used, or the use of very poorly defined and therefore very poorly scalable processes consisting of the complex combination of seeds (crystallization cores), surfactants, addition of heavy metal salts, processes in multiple steps, etc. (Jana, N. R.; Gearheart, L.; Murphy, C. J., Adv. Mater. 13, 1389, 2001; Christopher J. Johnson, Erik Dujardin, Sean A. Davis, Catherine J. Murphy, Stephen Mann, J. Mater. Chem. 12, 1765, 2002; Zhi-Chuan Xu, Cheng-Min Shen, Tian-Zhon Yang, Huai-Ruo Zang, Hong-Jun Gao, Nanotechnology, 18, 115608, 2007) as well as the use of processes in hydrothermal conditions, at pressures and temperatures above that of the environment also in the presence of different inhibitory substances of the specific growth of crystallographic faces (polymers, surfactants, etc) (Perez-Juste, J. et al.). In this last case, the shape and sizes can be very precisely controlled, but the method suffers from the drawbacks of using pressurized reactors. The mentioned methods are extremely sensitive to the experimental conditions, mentioning by way of example that simply changing the container that supplies the surfactants decisively affects the final shape being able to be truly anisotropic (Smith, D. K.; Korgel, B. A., Langmuir, 2008, 24, 644-649). Furthermore, Barnard et al. (Alireza Seyed-Razavi, Ian K. Snook, Amanda S. Barnard, J. Mater. Chem, 2010, 20, 416-421) recently conclude that a complete theory of nanoparticle evolution does not yet exist.

For all these reasons, there is a current need to provide chemical methods which allow control in the formation of anisotropic particles in a simple manner.

BRIEF DESCRIPTION OF THE INVENTION

The inventors of the present invention have surprisingly found a process which allows the anisotropic growth of metallic nanoparticles by using stable Atomic Quantum Clusters (AQCs) as catalyst. The inventors have also found that the anisotropic growth, i.e. the shape of the nanoparticles, can be modulated by controlling the ratio of the catalyst (AQC) concentration to the metal ion concentration, which is intended to form the nanoparticle.

The advantages of such process is that, by using a catalyst, wherein the catalyst in this invention is an AQC, it is possible to control the anisotropic growth in a much more precise manner than with other already known techniques, such as for example by means of seeding with seeds or thermal decomposition of metal salts; it can be used with high reagent concentrations which means an easier scaling thereof; high aspect ratio of nanoparticles is obtained; and it also allows the production in large scale of anisotropic nanoparticles in a simple, scalable and controlled manner, obtaining high yields of the particular nanoparticles.

It should be pointed out that for the present invention, it is not necessary to use agents commonly used as growth inhibitors such as: surfactants, polymers such as polyvinyl pyrrolidone, polyvinyl alcohol and polyacrylic acid. For this reason, the particles obtained can be bare particles, i.e., they do not have associated coatings such as surfactants, polymers or any other growth inhibitor.

Therefore, an aspect of the present invention relates to a process for preparing anisotropic metal nanoparticles comprising the step of reducing a metal cation to oxidation state zero in the presence of an atomic quantum cluster (AQC) and a solvent. Another aspect of the present invention relates to the controlled obtention of anisotropic metal nanoparticles by modifying the concentration ratio of the AQCs to the cores.

Another aspect of the present invention relates to the use of AQCs for preparing anisotropic metal nanoparticles.

DETAILED DESCRIPTION OF THE INVENTION

As commented above, the present invention relates to a new process for preparing anisotropic metal nanoparticles by means of catalysis by Atomic Quantum Clusters (AQCs), comprising the step of reducing a metal cation to oxidation state zero in the presence of said AQC, and a solvent. By varying the relative concentration of the catalyst (AQCs) to the cores, anisotropic metal particles with high aspect ratios and different types of structures or shapes, can be easily obtained.

The solvent present in the process of the present invention is selected from water, organic solvent and the combination thereof. The organic solvent may be polar or non-polar. In a particular embodiment the polar organic solvent useful in the present invention is selected from alcohol, such as methanol, ethanol, propanol, isopropanol and butanol; a ketone, such as acetone; a glycol, such as ethylene glycol, propylene glycol; and ionic liquids; and the combination thereof; and the non-polar organic solvent is selected from cyclic ether such as dioxane; saturated and unsaturated, linear, cyclic and branched hydrocarbons; toluene and benzene; and the combination thereof. Therefore, in one embodiment the solvent is selected from water, an alcohol, a ketone, a cyclic ether, a glycol, toluene, benzene or a combination thereof. In a preferred embodiment the solvent is water.

The metal ion, particularly the metal cation, $M^{q+}$ wherein q is the value of the oxidation state and it may be equal to one, two, three, four, five or six, reduced to oxidation state zero, $M^0$, in the process of the present invention, is a metal cation of a transition metal. Those metal atoms of transition metal at oxidation state zero will form, in a controlled manner, due to the presence of the AQCs, first the cores, and later the anisotropic metal nanoparticles. The term "core" refers to small nanoparticles of a size between about 2 nm and 4 nm. From the cores in contact with the AQCs, the anisotropic metal nanoparticles are formed.

In one embodiment, the metal cation of the transition metal is preferably in the form of metal salt. In a particular embodiment, the metal cation in the form of metal salt is preferably a transition metal cation, and preferably the transition metal cation is selected from, Au, Ag, Co, Cu, Pt, Fe, Cr, Pd, Ni and Rh, and preferably is selected from Au, Ag, Cu and Fe, and more preferably from Au and Ag. In a more particular embodiment, two or more different metal cation may be present in the process, and therefore, once reduced to oxidation state zero, the anisotropic metal nanoparticles may be formed by a combination of transition metals.

The anion, $X^{p-}$ wherein p may be equal to one or three, of the salt of the transition metal cation is selected from nitrate, acetate, citrate, halides such us chloride and any of the combinations thereof; preferably nitrate and chloride, and more preferably nitrate.

Therefore, examples of metal salts useful in the present invention are combinations of a transition metal cation selected from Au, Ag, Co, Cu, Pt, Fe, Cr, Pd, Ni and Rh, in one of its positive oxidation states and one, two or more anions selected from nitrate, acetate, citrate, chloride and any of the combinations thereof. Suitable salts include, but are not limited to, silver nitrate, hydrogen tetrachloroaurate(III) trihydrate, cobalt(II)nitrate, copper citrate, ferric nitrate, and the like.

The catalyst is selected from the Atomic Quantum Clusters (AQCs) described in patent ES2277531 B2, WO 2007/017550, the content of which is herein incorporated by reference, and especially the process of synthesis and examples. Therefore, in this invention AQCs are understood as material formed exclusively by zero-oxidation-state metal atoms, $M_n$, stable over time, with less than 200 metal atoms ($M_n$, n<200) and with a size of less than 2 nm. Preferably, in a particular embodiment, the AQCs present as catalyst for preparing anisotropic metal nanoparticles in the present invention are formed by between 2 and 55 metal atoms ($M_n$, $2 \leq n \leq 55$) with an approximate size between 0.3 nm and 1.2 nm; preferably from between 2 to 27 metal atoms ($M_n$, $2 \leq n \leq 27$); and more preferably from between 2 to 5 ($M_n$, $2 \leq n \leq 5$) metal atoms, with mean size of less than 1 nm, and preferably an approximate size between 0.3 nm and 0.9 nm.

The catalyst, the AQC, is at a concentration such that it allows the formation of the nanoparticles of the invention, therefore the concentration of the AQCs may be different depending on the desirable nanoparticles. As well it should be bear in mind that the process is scalable, therefore different concentrations might be employed when the process is carried out. In one particular embodiment the concentration of AQC in the reaction mixture is between about $0.1 \cdot 10^{-7}$-$9.9 \cdot 10^{-7}$ M, preferably is between about $3 \cdot 10^{-7}$-$7 \cdot 10^{-7}$ M. In a more particular embodiment the concentration of AQCs in the reaction mixture is about $5.5 \cdot 10^{-7}$ M.

Furthermore, the transition metal of the AQCs present in the process for preparing anisotropic metal nanoparticles are selected from Au, Ag, Co, Cu, Pt, Fe, Cr, Pd, Ni, Rh, and any of the combinations thereof. Preferably, the transition metal of the AQCs is selected from Au, Ag, Cu, Fe and any of the combinations thereof. More preferably, the transition metal of the AQCs is selected from Au, Ag and the combination thereof.

In one embodiment the at least one transition metal of the AQC and the at least one transition metal of the nanoparticle present in the process of this invention are the same. And in another embodiment the at least one transition metal of the AQC and the at least one transition metal of the nanoparticle are different.

In another embodiment the process of the present invention is carried out in the presence of a reducing agent. The reducing agent responsible for the reduction of the metal cation to oxidation state zero in the presence of an atomic quantum cluster (AQC) and a solvent in the process of the present invention is selected from a chemical reducing agent and a physical reducing agent.

In one embodiment the chemical reducing agent is selected from an organic reducing agent, an inorganic reducing agent and the solvent wherein the reduction reaction is performed.

In a particular embodiment the organic reducing agent is selected from alkylamines, preferably methylamine; sugars, preferably glucose, fructose, lactose or maltose; organic acids, preferably ascorbic acid and polymers, preferably polyvinylpyrrolidone. In another particular embodiment, the inorganic reducing agent is selected from sodium borohydride, hydrazine, lithium and aluminium hydride, hydroxylamine and sodium hypophosphite. And in another embodiment, the physical reducing agent is selected from UV-V radiation and ultrasounds.

In a preferred embodiment the reducing agent is a chemical reducing agent, preferably an organic reducing agent and more preferably the organic reducing agent is ascorbic acid.

In another embodiment, the process for preparing anisotropic metal nanoparticles comprising a reduction step in the presence of an atomic quantum cluster (AQC) and a solvent is carried out at a pressure between 0.5 and 1.5 atm., preferably at a pressure of about 1 atm.

In another embodiment, the process for preparing anisotropic metal nanoparticles comprising a reduction step in the presence of an atomic quantum cluster (AQC) and a solvent is carried out at a temperature at least 1° C. below the boiling temperature of the solvent. Preferably the process is carried out at a temperature of less than 40° C.; preferably between 10° C. and 40° C.; more preferably between 20° C. and 40° C.; still more preferably between 20° C. and 30° C.; and yet more preferably at approximately 25° C., i.e. preferably at room temperature.

Therefore, the method in turn can be easily applied and it means that preferably the process is carried out at atmospheric pressure, at 1 atm, and in any temperature range, preferably equal to approximately room temperature.

The anisotropic metal nanoparticles obtained by this process can have different shapes or types of structure. For example, shapes of nanoparticles that can be obtained by this invention are:

nanofibers, which are nanoparticles of one dimension, i.e. the nanoparticles have been elongated anisotropically in one direction, it can be found as well in the literature as nanocylinders, nanorods, nanowires or nanotubes;

nanodiscs, which are nanoparticles of two dimensions, i.e. the nanostructures have grown in two directions, they are bidimensional, e.g. nanotriangles, nanosquares, etc., and nanostructures elongated in three or more directions, i.e. tridimensional structures, e.g. nanostars, nanocubes, nanotetrahedrons or nanoprisms.

In a particular embodiment of this invention, the prepared nanofibers have a length between about 60-40 μm and a diameter between about 110-90 nm, and preferably they have a length of about 50 μm and a diameter of about 100 nm.

In one particular embodiment the aspect ratio (r) of the nanofibers obtained by this process is very high, particularly the aspect ratio (r) of the nanofibers is approximately between 400 and 600, preferably the aspect ratio (r) of the nanofibers is approximately 500. The term "aspect ratio" (r) relates to the ratio between the length of the major axis divided by the width of the minor axis or diameter of the nanofibers. As the other nanoparticles prepared by the process of the invention are bi- or tridimensional their aspect radios are not especially relevant for this invention.

Figure 9:
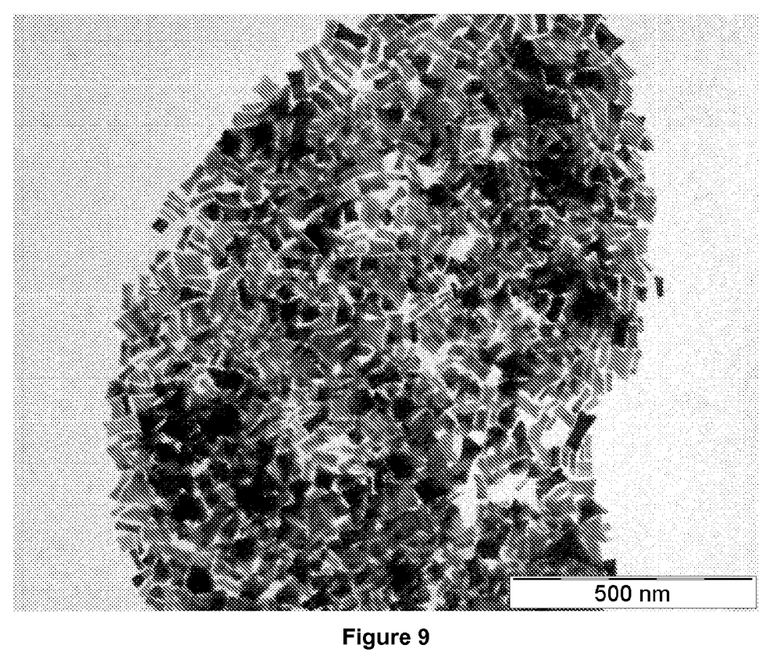
FIGS. 9 and 10 show Scanning Electron Microscopy (SEM) photographs with different magnifications, of the nanoparticles obtained in the example 3 after being deposited in a microscope grid. The formation of Au nanostars with an approximate size of 80-200 nm can be observed.
Figure 10:
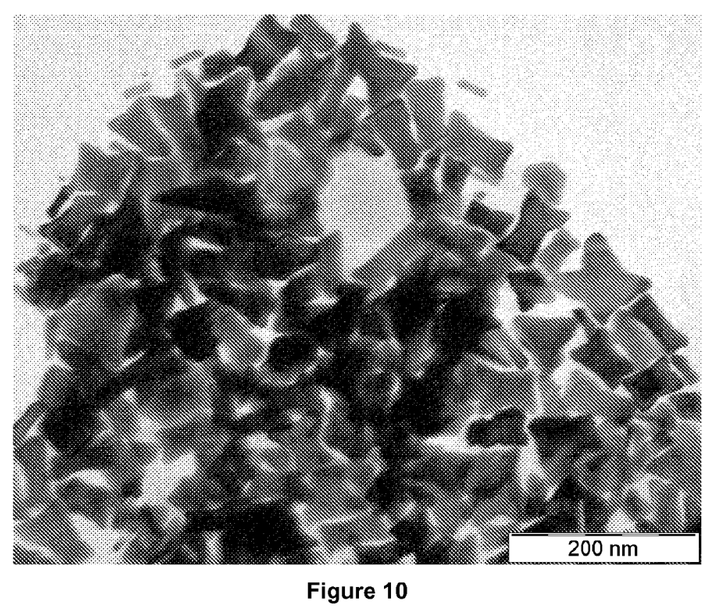

The AQCs, i.e. the catalyst, in the present invention can be added in a controlled manner, this being understood as controlling the ratio (R) of the catalyst concentration to the core concentration necessarily being chosen according to the anisotropy that is required to be generated, R being equal to approximately 1 to generate the growth of a single face and to obtain nanostructures elongated in one direction (nanofibers); R being equal to approximately 2 to generate the growth of two faces and to obtain flat structures (nanodiscs); R being equal to approximately 3 to generate the growth of three faces and to obtain triangular, cubic and prismatic structures; R being greater than approximately 3 and to obtain more complex three-dimensional anisotropic growths, such as multipods, etc. Prior tests must be conducted for the approximate determination of the core concentration, since it will depend on the particular rate of the reaction. This core concentration study may be carried out by means of monitoring the chosen reaction for the formation of the nanoparticles, the extraction of samples for their examination and determination of the core concentration. This can be carried out by, among other methods, electron transmission microscopy, laser light scattering and atomic force microscopy. For the purpose of the present invention, the particles formed in the reaction which have sizes comprised between approximately 2 and 4 nm will be considered as cores. A simpler way to find out the ratio R in an approximate manner is to perform a cluster concentration scan, starting without the addition of clusters, wherein nanospheres are formed. For example, as it will be further explained with the examples and the figures, when the core concentration will be approximately equal to that of clusters, R=1, nanofibers are obtained in a maximum proportion with respect to the remaining structures (see example 1); when the core concentration will be approximately the half of that of the clusters (R=2), nanotriangles are obtained in a maximum proportion with respect to the remaining structures (see example 2); and when the cluster concentration will be approximately 3.2 times that of the cores (R=3.2), tridimensional nanostars are obtained in a maximum proportion with respect to the remaining structures (see example 3). The nanostars as described herein are four-pointed tridimensional nanostars (see FIGS. 9 and 10).

Therefore, in one embodiment of the present invention the anisotropic metal nanoparticles formed are, or have the shape of, nanofibers, nanotriangles, nanostars, nanodiscs, nanocubes, nanotetrahedrons or nanoprisms, preferably nanofibers, nanotriangles or nanostars, and more preferably nanofibers.

Therefore, another aspect of the invention relates to the process for preparing anisotropic metal nanoparticles wherein the concentration ratio, R, of the catalyst to the cores is controlled. In one embodiment R is in between of approximately 1 and 5. In a preferred embodiment R is in between of approximately 1 and 3.2, and more preferably R is equal to 1, 2, 3 and 3.2.

Figure 1:
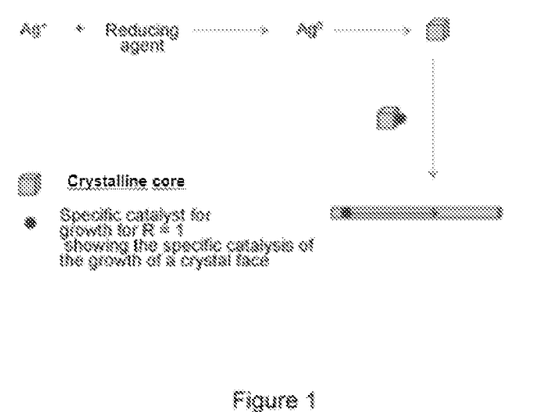
FIG. 1 shows a diagram of the proposed invention in which the action of a catalyst for the growth of crystalline faces in order to obtain the anisotropic structure preparation is schematically observed.
Figure 2:
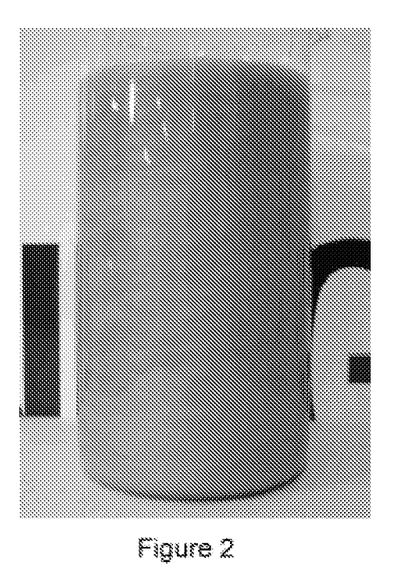
FIG. 2 shows the appearance of the product obtained four hours after the start of the reaction.
Figure 3:
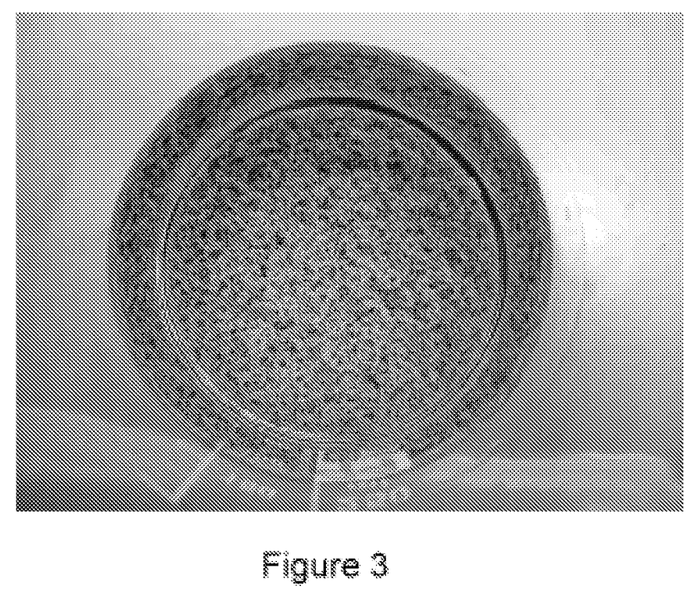
FIG. 3 shows the appearance of the nanofiber precipitate to the naked eye.
Figure 4:
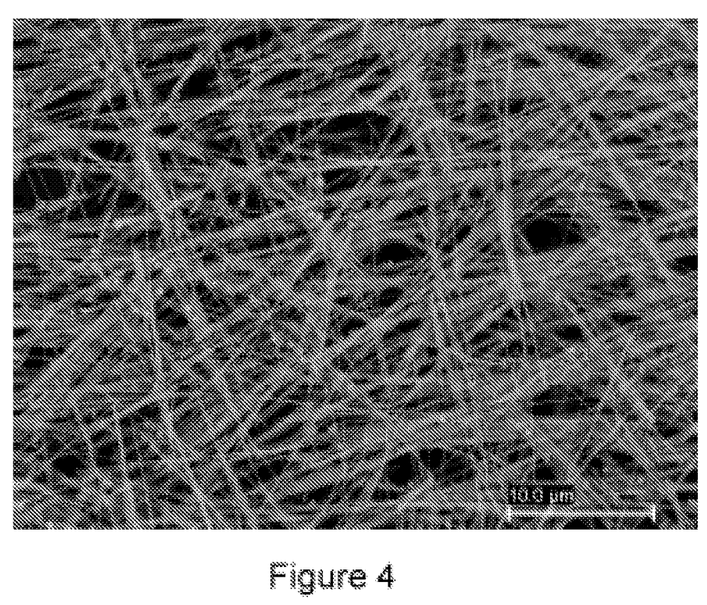
FIGS. 4 and 5 show scanning electron microscopy (SEM) photographs of the nanoparticles obtained in the example 1 after being deposited in a microscope grid. The formation of Ag nanofibers with an approximate diameter of 100 nm and length of 50 μm can be observed. Likewise, it is observed that the catalysis by Ag clusters directs the formation almost exclusively towards the formation of nanofibers, with a yield (with respect to spherical nanoparticles) greater than approximately 99% by weight.

In one embodiment, the concentration of anisotropic metal nanoparticles of a determined shape, i.e. nanofibers, nanotriangles, nanostars, nanodiscs, nanocubes, nanotetrahedrons or nanoprisms, obtained directly by the process of the invention, compared to any of the other anisotropic metal nanoparticles of a determined shape obtained directly by the same process is comprised between 70% and 100%, preferably between 90% and 100% and more preferably 98%. That means that, for example, when nanofibers are synthesized, that the percentage of nanofibers formed between all the nanoparticles formed is comprised between 70% and 100%, preferably between 90% and 100% and more preferably 98%. Therefore, it can be said that the formation of the nanofibers is catalyzed versus the formation of other nanoparticles, for example nanospheres, and particularly that the formation of the nanofibers is catalyzed by the presence of the AQCs. The AQCs then are catalyst of the formation of the nanoparticles, wherein the term "catalyst" relates to a substance which catalyzes the growth of any crystalline face of the crystalline cores which are formed during the growth of the nanoparticles compared to other faces thus generating an anisotropy in the final geometry of the obtained nanoparticle as is schematically depicted in FIG. 1. In other words, the catalyst is introduced to direct the formation of the anisotropic structures and is independent of whether chemical catalysts are used or not in the reduction step for the salt.

In another embodiment a growth inhibitor is additionally added for preparing the anisotropic metal nanoparticles. The term "growth inhibitors" comprises, among others, polymers such as polyvinylpyrrolidone; thiols, phosphines and amines.

In another embodiment seeds are additionally added. The term "seeds" is defined in the article by Pérez-Juste, J.; Pastoriza-Santos, I.; Liz-Marzán, L. M.; Mulvaney, P., Coordination Chemistry Reviews, 249, 2005, 1870-1901, the content of which is herein incorporated by reference. In this case, for calculating the previously defined concentration ratio, R, to be used the seed concentration must be used instead of the core concentration generated in the reaction. Another aspect of the present invention relates to the use of an AQC for preparing anisotropic metal nanoparticles.

Another aspect of the present invention relates to the use of an AQC for obtaining nanofibers.

Another aspect of the present invention relates to the use of an AQC for obtaining nanotriangles.

Another aspect of the present invention relates to the use of an AQC for obtaining nanostars.

Another aspect of the present invention relates to the use of an AQC wherein the reaction is an oxidation reaction comprising a chemical oxidation agent.

Another aspect of the present invention relates to the use of an AQC in a reduction reaction comprising a chemical reducing agent.

Another aspect of the present invention relates to any combination of the aforementioned embodiments.

All the technical and scientific terms throughout the present invention have the same meaning as that commonly understood by a person skilled in the art to which the invention belongs. Throughout the description and claims, the word "comprises" and its variants do not exclude other technical features, components or stages. For the person skilled in the art, other objects, advantages and characteristics of the invention will be inferred in part from the description and in part from putting the invention into practice.

As used herein, the terms "about" and "approximately" mean a slight variation of the value specified, preferably within 10 percent of the value specified. Nevertheless, the terms "about" and "approximately" can mean a higher tolerance of variation depending on for instance the experimental technique used. Said variations of a specified value are understood by the skilled person and are within the context of the present invention. Further, to provide a more concise description, some of the quantitative expressions given herein are not qualified with the terms "about" and "approximately". It is understood that, whether the terms "about" and "approximately" are used explicitly or not, every quantity given herein is meant to refer to the actual given value, and it is also meant to refer to the approximation to such given value that would reasonably be inferred based on the ordinary skill in the art, including equivalents and approximations due to the experimental and/or measurement conditions for such given value.

The following example and the drawings illustrate the scope of the invention and do not intend to be limiting.

EXAMPLES

Example 1

Synthesis of Ag Nanofibers with an Aspect Ratio (r) Equal to Approximately 500 and a Concentration Ratio R Equal to Approximately 1

Figure 5:
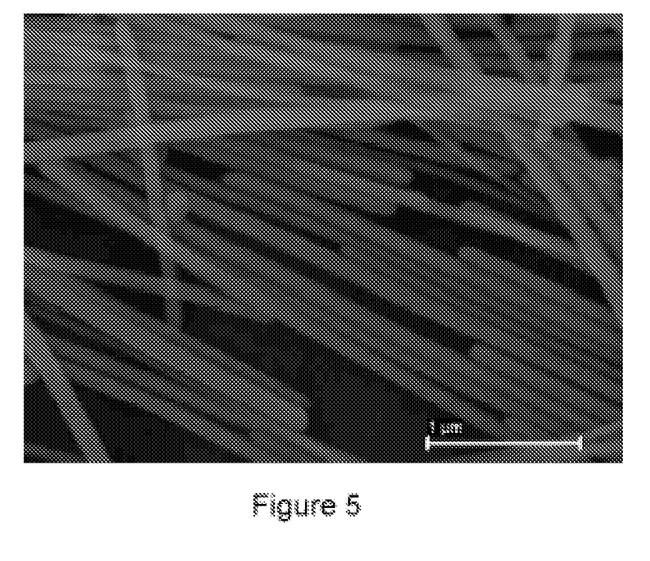
Figure 6:
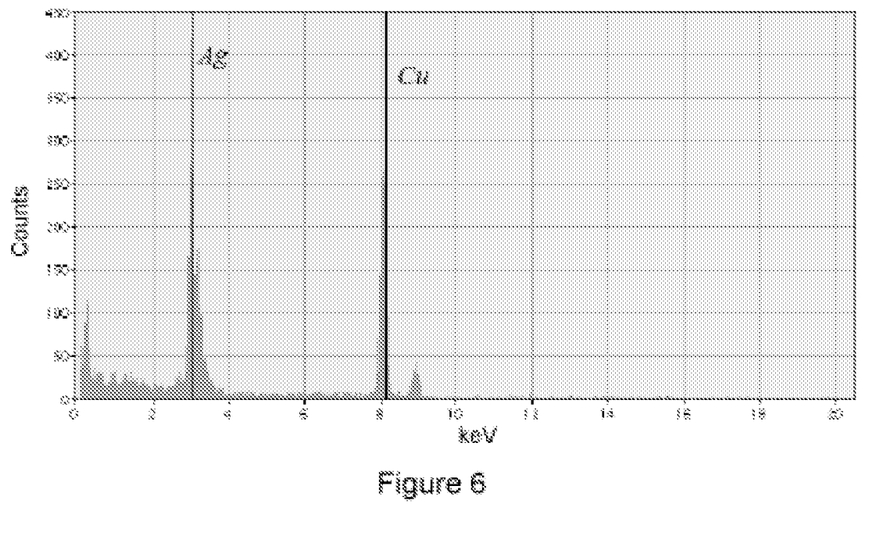
FIG. 6 shows the analysis of the fibers by means of Energy Dispersive Spectroscopy by X-rays (EDS), the presence of Ag (the Cu corresponds to the grid used for the measurement) being clearly observed.
Figure 7:
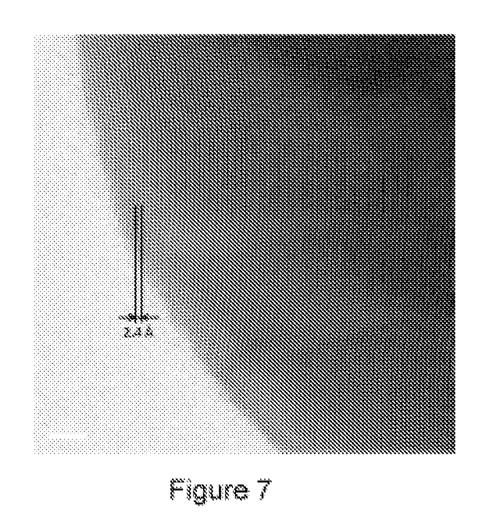
FIG. 7 depicts a high resolution Transmission Electron Microscopy (TEM) image wherein the crystallinity of the fibers is clearly observed. The planes observed at distances of 0.24 nm correspond to the planes (111) of the metal silver.

1 L of water at 25° C. is introduced into a 10 L glass container with mechanical stirring. 30 mL of an Ag cluster solution, of Ag AQCs of between 2 to 5 atoms, $Ag_2$—$Ag_5$, with a concentration 10 mg/L are then added. 3.5 g of ascorbic acid are subsequently introduced under stirring and after 5 minutes 4 L of water are added. Finally, 3.4 g of silver nitrate are added under strong stirring. The reaction is constantly stirred for 4 hours. The Ag nanofibers are obtained as a precipitate which is dispersed again by stirring. The approximate percentage of fibers with respect to the total nanoparticles can be determined from the figures of the Scaning Electron Microscopy (see FIG. 5), this percentage being greater than 98% by weight. The overall yield of the reaction is about 100%.

The aspect ratio (r) is calculated from the relation length/diameter, $50 \cdot 10^{-6}/100 \cdot 10^{-9}$ which is 500.

Example 2

Synthesis of Au Nanotriangles with a Concentration Ratio R Equal to Approximately 2

Figure 8:
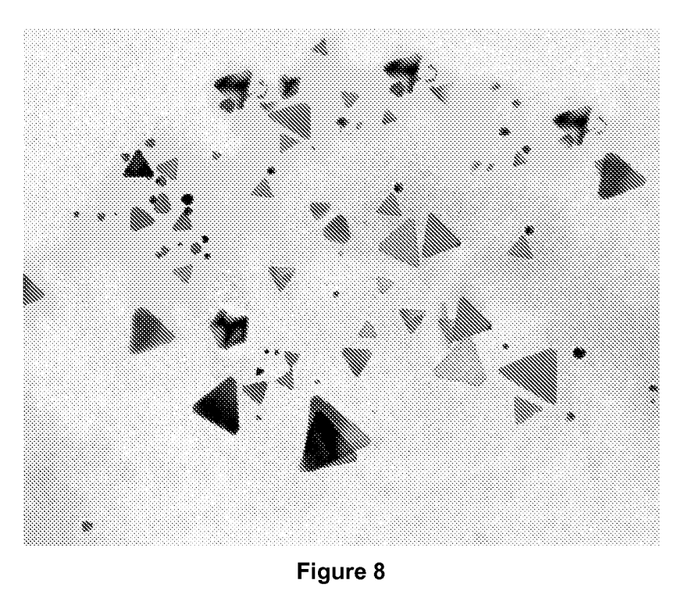
FIG. 8 shows a Scanning Electron Microscopy (SEM) photograph of the nanoparticles obtained in the example 2 after being deposited in a microscope grid. The formation of Au nanotriangles with an approximate size of 20-50 nm can be observed.

1 L of water at 25° C. is introduced into a 10 L glass container with mechanical stirring. 15 mL of an Ag cluster solution, of Ag AQCs of between 2 to 5 atoms, $Ag_2$—$Ag_5$, with a concentration 10 mg/L are then added. 2 g of ascorbic acid are subsequently introduced under stirring and after 5 minutes 4 L of water are added. Finally, 1 g of $HAuCl_4.3H_2O$ is added under strong stirring. The reaction is constantly stirred for 1 hour. The Au nanoparticles are obtained as a precipitate which is dispersed again by stirring. It can be observed that the catalysis with Ag clusters, in a synthesis with R equal to approximately 2, compared to Example 1 with values of R equal to approximately 1, leads to the almost exclusively formation of triangular nanoparticles. The approximate percentage of nanotriangles with respect to the total nanoparticles can be determined from the figure of the Scanning Electron Microscopy (see FIG. 8), this percentage being greater than 95% by weight. The overall yield of the reaction is about 100%.

Example 3

Synthesis of Au Nanostars with a Concentration Ratio R Equal to Approximately 3.2

1 L of water at 25° C. is introduced into a 10 L glass container with mechanical stirring. 25 mL of an Ag cluster solution, of Ag AQCs of between 2 to 5 atoms, $Ag_2$—$Ag_5$, with a concentration 10 mg/L are then added. 2 g of ascorbic acid are subsequently introduced under stirring and after 5 minutes 4 L of water are added. Finally, 1 g of $HAuCl_4.3H_2O$ is added under strong stirring. The reaction is constantly stirred for 1 hour. The Au nanoparticles are obtained as a precipitate which is dispersed again by stirring. It can be observed that the catalysis with Ag clusters, in a synthesis with R equal to approximately 3.2, compared to Examples 1 and 2 with values of R equal to approximately 1 and 2 respectively, leads to the almost exclusively formation of star shape nanoparticles. The approximate percentage of nanostars with respect to the total nanoparticles can be determined from the figures of the Scanning Electron Microscopy (see FIGS. 9 and 10), this percentage being greater than 90% by weight. The overall yield of the reaction is about 100%.

The invention claimed is:

1. A process for preparing anisotropic metal nanoparticles comprising:
   reducing a metal cation to oxidation state zero in the presence of an atomic quantum cluster (AQC) and a solvent, wherein the AQC consists of zero-oxidation-state metal atoms with less than 200 metal atoms and with a size of less than 2 nm.

2. The process according to claim 1, wherein the solvent is selected from the group consisting of water, alcohols, ketones, cyclic ethers, glycols, toluene, benzene, and combinations thereof.

3. The process according to claim 1, wherein the metal cation is a transition metal cation in the form of metal salt, wherein the metal cation of the transition metal is selected from the group consisting of Au, Ag, Co, Cu, Pt, Fe, Cr, Pd, Ni, Rh and Pb.

4. The process according to claim 3, wherein the metal cation is selected from the group consisting of Au, Ag, Cu and Fe.

5. The process according to claim 3, wherein the metal salt comprises an anion selected from the group consisting of nitrate, acetate, citrate and chloride.

6. The process according to claim 5, wherein the anion of the metal salt is selected from the group consisting of nitrate and chloride.

7. The process according to claim 1, wherein the metal cation is reduced to oxidation state zero by use of a reducing agent, wherein the reducing agent for reducing the metal cation to oxidation state zero is selected from the group consisting of chemical reducing agents and physical reducing agents.

8. The process according to claim 7, wherein the chemical reducing agent is selected from the group consisting of:
   organic reducing agents selected from the group consisting of alkylamines, sugars, polymers and organic acids, and
   inorganic reducing agents selected from the group consisting of sodium borohydride, hydrazine, lithium hydride, aluminum hydride, hydroxylamine, and sodium hypophosphite.

9. The process according to claim 8, wherein the chemical reducing agent is ascorbic acid.

10. The process according to claim 1, wherein the AQCs comprise on average between 2 and 55 metal atoms.

11. The process according to claim 1, wherein the transition metal of the AQC is selected from the group consisting of Au, Ag, Co, Cu, Pt, Fe, Cr, Pd, Ni, Rh, Pb, and any of the combinations thereof.

12. The process according to claim 1, wherein the transition metal of the AQC is selected from the group consisting of Au, Ag, Cu and Fe.

13. The process according to claim 1, comprising further adding a growth inhibitor.

14. The process according to claim 1, comprising further adding seeds.

15. The process according to claim 1, wherein the anisotropic metal nanoparticles are selected from the group consisting of nanofibers, nanotriangles, nanostars, nanodiscs, nanocubes, nanotetrahedrons, and nanoprisms.

16. The process according to claim 2, wherein the metal cation is a transition metal cation in the form of metal salt, wherein the metal cation of the transition metal is selected from the group consisting of Au, Ag, Co, Cu, Pt, Fe, Cr, Pd, Ni, Rh, and Pb.

17. The process according to claim 1, wherein the AQCs comprise on average between 2 and 5 metal atoms.

* * * * *